Jan. 8, 1929.
H. J. FRIEDL
1,698,475
TRANSMISSION OR BRAKE BAND
Filed Feb. 17, 1925
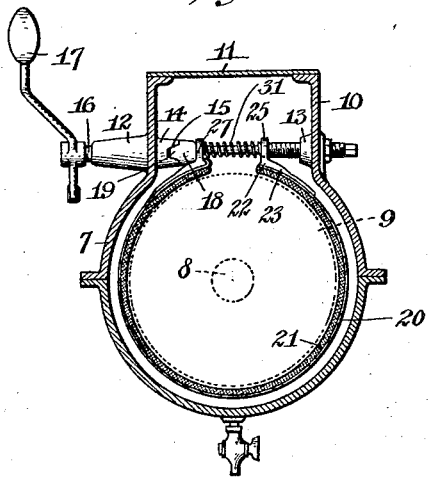
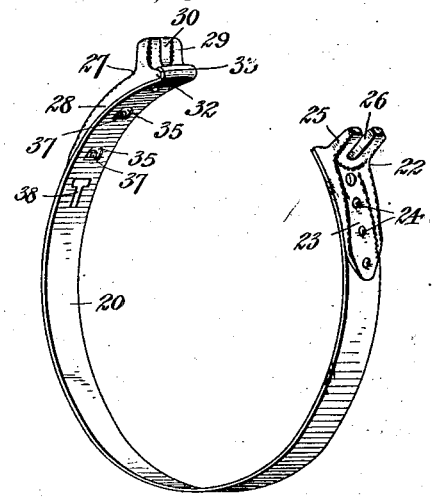
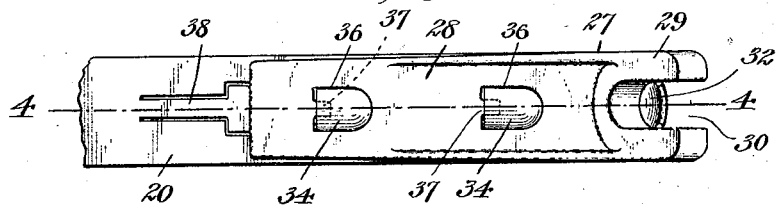
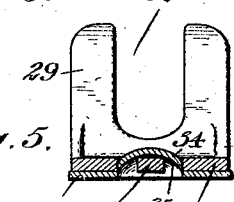
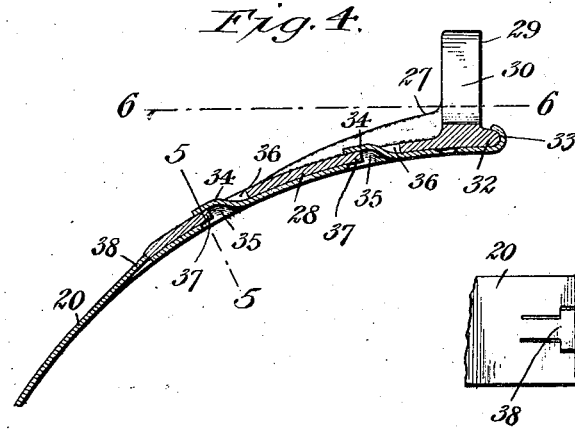
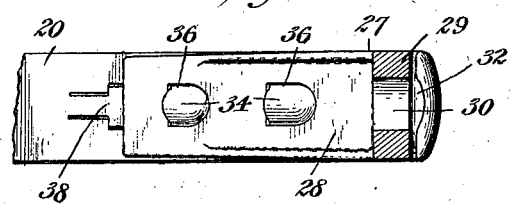
Hugh J. Friedl, Inventor.
By Emil Kuhart, Attorney.
Witness:
J. J. Oberst, Patented Jan. 8, 1929.

1,698,475

UNITED STATES PATENT OFFICE.

HUGH J. FRIEDL, OF BUFFALO, NEW YORK.

TRANSMISSION OR BRAKE BAND.

Application filed February 17, 1925. Serial No. 9,778.

My invention relates to automobile transmission or brake bands, and more particularly to that type applied to planetary transmission mechanisms, such as employed in "Ford" automobiles.

The invention relates more specifically to that type of transmission or brake band wherein the ends of the band are provided with connectors adapted for co-action with parts of operating mechanism manipulated by foot pedals, and in which one of the connectors is removably secured to one of the ends of the band to permit of more readily removing the band from the casing enclosing the transmission mechanism and also to permit of readily inserting a band around a drum forming part of such transmission mechanism.

It is the object of my invention to provide a removable connector on one end of a transmission or brake band and to so construct the connector and the co-operating portion of the band that the connector will be securely fastened to the band without permitting movement thereof in any direction and at the same time permit the ready detachment of the connector from the band to facilitate the removal of the band from the transmission casing or the insertion of the band into the casing.

The invention has for a further object, the provision of a connector which can be quickly and securely fastened to a transmission or brake band without the use of bolts, rivets, or other separate extraneous fastening devices.

A still further object of my invention is to so form the connector and the band that parts thereof will engage or interlock without resorting to the use of a third part for fastening the two together.

With the above and other objects in view to appear hereinafter, the invention consists in the novel features of construction and in the arrangement and combination of parts to be hereinafter described and more particularly pointed out in the subjoined claims.

In the drawings:—

Fig. 1 is a transverse section through a transmission casing of a Ford automobile, showing one of the drums of the transmission mechanism and the shaft therein in dotted lines, and showing an edge view of a transmission or brake band located within said casing and co-acting with pedal-operated spring-retrieved mechanism for applying the band to the drum and releasing the same therefrom.

Fig. 2 is a perspective view of a transmission band constructed in accordance with my invention.

Fig. 3 is a plan view of that end of the band having the removable connector of this invention thereon.

Fig. 4 is a longitundinal section taken on line 4—4, Fig. 3.

Fig. 5 is a transverse section taken on line 5—5, Fig. 4.

Fig. 6 is a section taken on line 6—6, Fig. 4.

Reference being had to the several parts illustrated in the drawings, the numeral 7 designates the transmission casing of an automobile through which a shaft is passed lengthwise, said shaft being indicated in dotted lines and designated by the numeral 8. On the shaft is indicated with dottel lines, a drum 9 of which there are invariably three arranged in close juxtaposition, one serving as a clutch drum, the second as combined brake and reverse drum, and the third as a slow speed drum.

Only one of these is shown in the drawing; it being, however, understood that a band is used in connection with each drum and operated by individual foot-operated mechanism.

The transmission casing is formed with an upward extension or bonnet 10 open at its upper end and applied to said upper end is a cover 11, which is removable to gain access to the interior of the transmission mechanism casing.

On the side walls of the bonnet 10, elongated bearings 12, 13 are formed. These bearings are transversely alined and part of each extends outwardly from its supporting wall while a second part extends inwardly, the inward extension 14 of the bearing 12 being provided with cam notches 15. Mounted for combined rocking and sliding movement in the bearing 12 is a shaft 16 to which an operating pedal 17 is secured. On said shaft adjacent the inward extension of the bearing 12 is a cam collar 18 having lugs 19 fitting the notches 15 of the inward extension 14 and being so shaped that upon rocking said shaft, when depressing the pedal 17, the lugs 19 ride on the inclined faces of the notches 15 and move the shaft 16 inward while rotating. This part of the mechanism illustrated, is not a part of my invention and is used simply to illustrate the mode of operating the brake band, and the operating mechanism may therefore be constructed in various other ways.

The brake band is designated by the numeral 20 and is constructed of comparatively thin spring steel curved into an open ring and having the usual lining 21 riveted or otherwise applied to its inner surface. Applied to one end of this band is the usual fixed connector 22, which has an arcuate base portion 23 through which and the band, rivets 24 are passed for fastening the connector to said band. At the outer end of this base portion an outwardly-directed forked ear or lug 25 is provided, which furnishes a notch 26 opening outwardly therein.

At the other end of the band my improved detachable connector 27 is arranged. Like the usual fixed connector of a transmission band of this type, it comprises an arcuate base portion 28 which lies against the outer side of the band proper, and has at its outer end the forked outwardly-extending ear or lug 29, the notch 30 of this ear being transversely alined with the notch in the ear 25 of the fixed connector. Through said two notches, the shaft 16 is passed, a spring 31 being interposed between the ears of the two connectors and surrounding said shaft 16, opposite ends of said spring bearing against the opposed ears of said connectors and serving to separate them so as to release the band 20 from the drum 9.

The connector 27 is provided at its outer end with a transverse bead or extension 32, which has its outer edge rounded and curved longitudinally, and the corresponding end portion of the band is bent or curved upon itself to form a transverse groove 33, which is curved longitudinally to receive said bead or extension. By longitudinally curving the outer edge of said bead or extension and the bent or curved portion of the band, a somewhat extended bearing is provided for the outer end of the connector. When the connector is forced firmly against the bent or curved portion of said band, it is held against movement radially and also laterally. While it is not believed to be essential to use said bead and groove construction in connection with other parts of my invention to be presently described, it nevertheless increases the efficiency of the band and acts as an additional safeguard in the event of other parts of the mechanism becoming disarranged or distorted, and tending to force the connector from the band; or when for any other reason the connector should become loosened from the band.

On that end of the band to which my improved connector is to be attached, said band is provided with lug-receiving pockets 34 formed by slitting the band transversely and centrally through a portion of its width and stamping the metal outwardly at one side of the slit so as to provide depressions 35 on the inner side of the band. These pockets may be referred to as external protuberances open at one end, and the base portion 28 of the connector 27 is provided with spaced openings 36 shaped to receive the protuberances, said base portion having a lug 37 at one end of each opening 36 adapted to be thrust into the pockets 34 formed on the band.

It is to be noted that the protuberances are transversely and longitudinally curved, and in applying the connector to the band it is simply necessary to place the connector onto the band so that portions of the protuberances are entered into the openings of the connector. With the parts so arranged, the retainer lugs 37 extending from the inner end walls of said openings will be positioned behind the open end of said protuberances, after which it is only required that the connector be drawn outwardly or toward the end of the band, which will cause said lugs to enter the pockets formed by said protuberances, and when so positioned, the inner end walls of the openings in said band lie in contact with the open or inner ends of said protuberances. By reason of said protuberances, or the walls of said pockets being curved transversely, the tendency of the inwardly-receding portions of the wall is to force the retainer lugs 37 inwardly and consequently fasten the connector securely to the band.

When forcing the connector into position, the rib or extension 32 at the outer end thereof will enter the transverse groove 33, and by reason of said groove being transversely curved and the extension or rib being similarly formed, the outer end of the connector is held against lateral movement in both directions.

With a view of preventing movement of the connector lengthwise or inwardly toward the center of the band, retainer means are provided at the inner end of the band, and for this purpose I preferably stamp from the band a spring tongue 38, the inherent resiliency of which retains the outer end of this tongue above the outer surface of the band and in contact with the inner end of the connector so that the connector is held against movement lengthwise in one direction by this tongue or retaining means, and in the other direction by the protuberances forming the pockets 34, and also by the curved end 33 of the band. It will be apparent therefore that the connector, when positioned on the band, is held firmly thereon; and when it is desired to remove the same from the band it is merely necessary to depress the spring tongue 38 and force the connector inwardly along the band until the inner end of this connector rides over the tongue and the retainer lugs 37 are withdrawn from their receiving pockets. When this occurs, the bead or extension 32 at the outer end of the connector will also be withdrawn from its receiving groove.

It is not believed necessary in all cases to use the bead or extension 32 at the outer end of the connector and the receiving groove for the same at the outer end of the band, although where maximum assurance is desired against play of the connector on the band or accidental removal of the connector from the band, due to wearing of the parts after long use, the incorporation of said bead and groove will be found of advantage.

While the employment of a spring tongue stamped from the band is simple, inexpensive, and efficient, it is to be understood that any other means for guarding against lengthwise inward movement of the connector may be substituted for use in connection with the other features of my invention.

It is to be noted that the spring tongue shown, is of substantially T-formation, and that the band is slit transversely and longitudinally, to form said tongue. By transversely widening the tongue when giving the same a T-formation, the outer end thereof furnishes an extended bearing for the end of the connector.

Having thus described my invention, what I claim is:—

1. A transmission band comprising an open ring band having a spring tongue stamped therefrom, the inherent resiliency of which positions the outer end of said tongue normally above the outer surface of said band, and an elongated connector detachably applied to one end of said band and having said spring tongue engaging the end edge of said connector.

2. A transmission band comprising an open ring band slit transversely at spaced points and having the metal at corresponding sides of said slits bulged outwardly to form transversely curved protuberances providing lug-receiving pockets opening at corresponding ends of said protuberances, said band having also an outwardly projecting free-ended tongue stamped therefrom and spaced from the innermost of said protuberances, an elongated connector having an arcuate base portion in contact with the outer surface of said band and an outwardly-extending forked ear, said base portion having spaced openings into which said protuberances extend and retainer lugs extending into said openings from the inner walls thereof and entered into said pockets, the inner walls of said openings lying in contact with the inner open ends of said protuberances and the free end of said tongue engaging the inner end edge of said connector.

In testimony whereof I affix my signature.

HUGH J. FRIEDL.